(12) United States Patent
Johnson et al.

(10) Patent No.: US 8,690,222 B2
(45) Date of Patent: Apr. 8, 2014

(54) VEHICLE FLOOR MAT OR FLOOR LINER KIT HAVING A CLIP

(75) Inventors: Kenneth Douglas Johnson, Derby, KS (US); Robert D. Tyler, Winfield, KS (US)

(73) Assignee: Winfield Consumer Products, Inc., Winfield, KS (US)

( * ) Notice: Subject to any disclaimer, the term of this patent is extended or adjusted under 35 U.S.C. 154(b) by 0 days.

(21) Appl. No.: 13/480,879

(22) Filed: May 25, 2012

(65) Prior Publication Data
US 2013/0313854 A1   Nov. 28, 2013

(51) Int. Cl.
*B62D 25/20*   (2006.01)
*B60N 3/04*   (2006.01)

(52) U.S. Cl.
CPC ..................... *B60N 3/046* (2013.01)
USPC ...................................... 296/97.23

(58) Field of Classification Search
CPC ....................................... B60N 3/046
USPC ............. 296/97.23, 39.1; 24/306; 16/4
See application file for complete search history.

(56) References Cited

U.S. PATENT DOCUMENTS

| | | | | |
|---|---|---|---|---|
| 5,384,939 | A * | 1/1995 | Weber | 24/306 |
| 6,202,261 | B1 * | 3/2001 | Moore et al. | 24/115 R |
| 6,497,003 | B2 * | 12/2002 | Calabrese | 16/4 |
| 7,546,661 | B2 * | 6/2009 | Connor, Jr. | 16/4 |
| 8,122,567 | B2 * | 2/2012 | Connor, Jr. | 16/4 |
| 8,402,605 | B2 * | 3/2013 | Courtin et al. | 16/4 |
| 2010/0212119 | A1 * | 8/2010 | Dendo | 24/453 |

FOREIGN PATENT DOCUMENTS

JP   2011121538 A  *  6/2011
JP   2011195071 A  *  10/2011

* cited by examiner

*Primary Examiner* — Glenn Dayoan
*Assistant Examiner* — Pinel Romain
(74) *Attorney, Agent, or Firm* — Theodore M. Magee; Westman, Champlin & Koehler, P.A.

(57) ABSTRACT

Vehicle floor mat or floor liner kits are provided. In one embodiment, a vehicle floor mat or floor liner kit includes one or more vehicle floor mats or liners, and a clip. Each vehicle floor mat or liner has at least one aperture. The clip has first and second portions. The first portion is configured to secure the clip to a floor of a vehicle. The second portion is configured to secure the floor mat or liner to the clip utilizing the at least one aperture. In another embodiment, a vehicle floor mat or liner clip includes a top portion and a bottom portion. The top portion has a threaded aperture and an annular ring that surrounds the threaded aperture. The annular ring has a titled surface between an inner circumference and an outer circumference. The bottom portion has a threaded shaft, a disk, and a fastener section.

16 Claims, 8 Drawing Sheets

VEHICLE FLOOR MAT OR FLOOR LINER KIT HAVING A CLIP

BACKGROUND

Floor mats are commonly used to cover surfaces. For example, floor mats may be used to protect floor and cargo areas of a vehicle against the elements. In one embodiment, a floor mat is a piece of durable, pliable synthetic material having an outer wall for containing water, dirt, rocks or the like. The mat is set in a floor or cargo area of a vehicle in order to collect undesirable materials rather than having the materials accumulate on the surface of the floor or cargo area. It is generally easy to remove and clean a mat because its material is typically of a nature that is easy to shake out or hose off. Some but not all mats are carpeted, and in this case, it may be desirable to vacuum the mat. While mats often come with a vehicle when purchased, there are many after-market mats available from many commercial sources. In some cases, the after-market mats are of a higher quality than the mats that come with the vehicle from the factory. For example, an after-market mat may be made of a relatively more durable and/or long lasting material.

In addition to floor mats, another item that can be used to cover a surface is a floor liner. Generally speaking, a floor liner is a bit thinner and lighter than a mat. Further, a floor liner will often have a tall outer rim and a contour design specifically conforming to raised surfaces that surround a particular floor and/or cargo area. In contrast, most standard mats will have a relatively uniform raised wall around its entire outside perimeter. This wall is depended upon for containment of undesirable materials instead of, as is the case with a floor liner, some degree of reliance upon a portion of the mat that extends vertically up and away from a plane that is generally parallel with the bottom flat surface of the floor and/or cargo area. Floor liners may include one or more raised walls to help contain the material but they generally will also have upward surfaces that extend well above the flat base portion of the liner in conformance with corresponding vehicle surface that surround the flat vehicle area where the liner is to be installed.

A floor liner is usually made from an ultra-durable material such as a rubberized-plastic material. Usually the material makes the product relatively light in feel as compared to the heavy-duty rubber materials used in many standard floor mats. Many floor liners also have more of a stiff feeling than a standard floor mat might have. While the materials utilized in floor liners may lead to a product that has a light and relatively stiff feel, they also lead to a product that is generally thinner than a standard mat and yet water tight and effective in protecting the interior of a vehicle.

SUMMARY

An aspect of the disclosure relates to vehicle floor mat or floor liner kits. In one embodiment, a vehicle floor mat or floor liner kit includes one or more vehicle floor mats or liners, and a clip. Each vehicle floor mat or liner has at least one aperture. The clip has a first portion and a second portion. The first portion is configured to secure the clip to a floor of a vehicle. The second portion is configured to secure the floor mat or liner to the clip utilizing the at least one aperture.

In another embodiment, a vehicle floor mat or liner clip includes a top portion and a bottom portion. The top portion has a threaded aperture and an annular ring that surrounds the threaded aperture. The annular ring has a tilted surface between an inner circumference and an outer circumference. The bottom portion has a threaded shaft, a disk, and a fastener section. The threaded shaft is configured to be threaded into the threaded aperture of the top portion. The disk separates the threaded shaft from the fastener section, and the fastener section is configured to secure the vehicle floor mat or liner clip to a floor of a vehicle.

These and various other features and advantages that characterize the claimed embodiments will become apparent upon reading the following detailed description and upon reviewing the associated drawings.

DETAILED DESCRIPTION

Embodiments of the present disclosure include clips. In certain embodiments, the clips may be used to secure a floor mat or a floor liner to the floor of a vehicle. For instance, one or more clips may be used to hold a floor mat or floor liner within the driver side of a vehicle in place. This can be useful for example to prevent the floor mat or floor liner from interfering with a driver's operation of the gas, break, and/or clutch pedals. In another embodiment, clips are sold together along with one or more floor mats or floor liners as a kit. A customer can then purchase a kit and install the floor mats or liners into his or her car using the clips. The clips can be useful for preventing the floor mats or liners from moving. It should be noted however that embodiments are not strictly limited to vehicle settings, and that embodiments of clips can illustratively be used in settings outside of a vehicle context.

Figure 1:
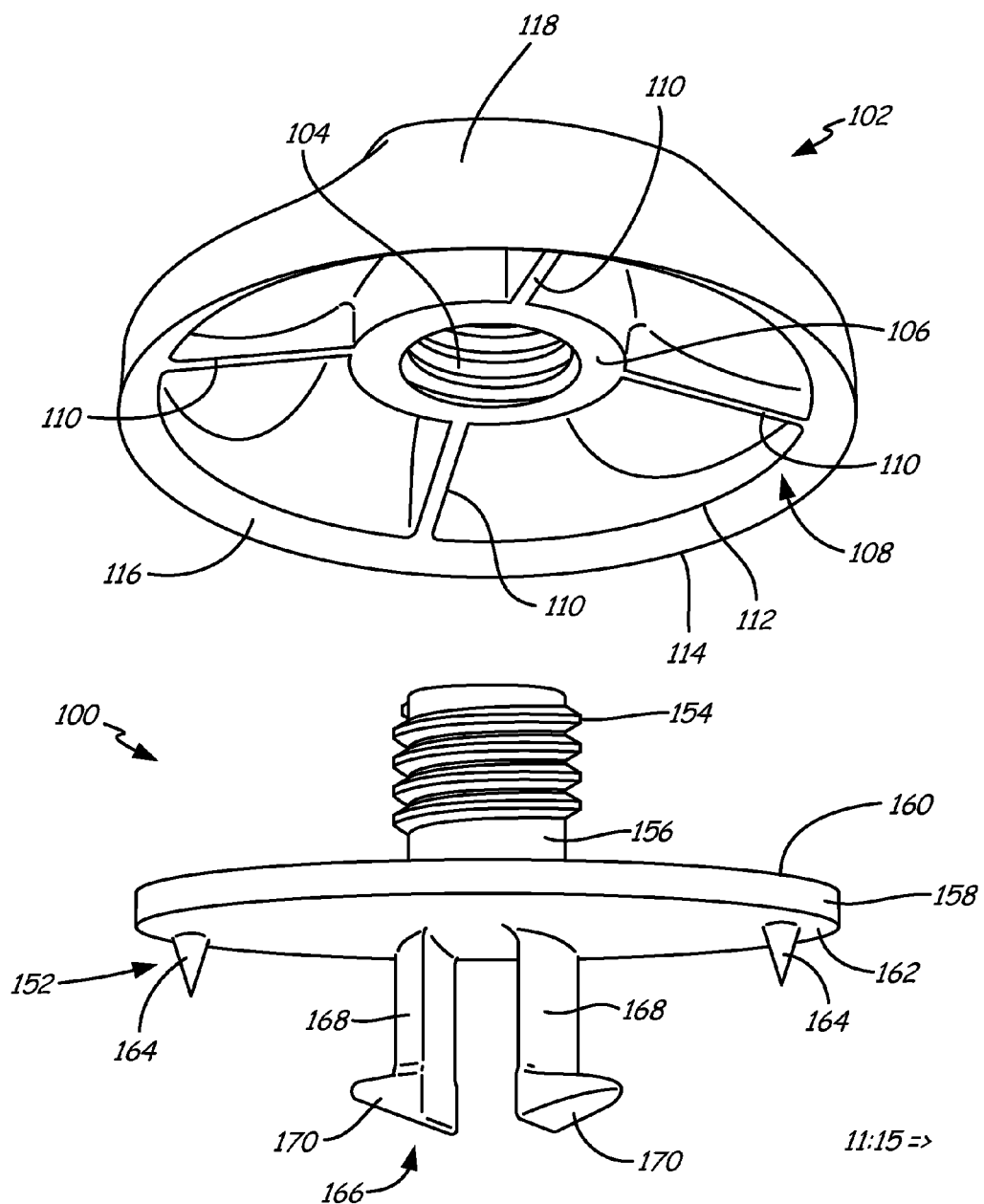
FIG. 1 is a perspective view of a floor mat or floor liner clip.

FIG. 1 is a perspective view of one embodiment of a clip 100. Clip 100 includes a top portion 102 and a bottom portion 152. Top portion 102 and bottom portion 152 are illustratively formed such that they can be connected together. For example, bottom portion 152 may have a threaded shaft 154 that fits within (e.g. is screwed into) a threaded aperture 104 of top portion 102. Embodiments are not however limited to threaded connections, and other embodiments of top portions 102 and bottom portions 152 can be connected in any other way (e.g. clasps, adhesives, clips, magnets, hooks, etc.) that enable top portion 102 and bottom portion 152 to be securely held together.

Bottom portion 152 may also include a segment of the shaft 156 that is smooth or unthreaded. This segment can be used to form a gap between top portion 102 and bottom portion 152 that enables a floor mat or floor liner to be held between the two portions. However, in other embodiments, the entire shaft of bottom portion 152 may be either threaded or unthreaded as desired.

Bottom portion 152 may optionally also include a disk 158. In one embodiment, such as in the one shown in the figure, disk 158 includes a flat rounded shape. However, disk 158 is not limited to any particular shape and may include other shapes as well (e.g. squared, rectangular, oval, etc.). Disk 158 has a first surface 160 that faces a mat or liner when clip 100 is engaged to a mat or liner. Surface 160 may act to sandwich or clamp a mat or liner to hold it in place.

Disk 160 can also have a second surface 162. Second surface 162 illustratively faces away from a mat or liner and towards a floor (e.g. a floor of a vehicle). In one embodiment, second surface 162 has one or more protrusions 164. Protrusions 164 may be spiked or coned shape as shown in the figure, or may have any other shape. Protrusions 164 can be used to hold clip 100 in place. For example, protrusions 164 can dig into the carpeting of a vehicle floor to prevent clip 100 from moving.

Clip 100 may also include a fastener section 166. In one embodiment, fastener section 166 includes two elongated members 168 that connect second surface 162 to hooks 170. Elongated members 168 are illustratively flexible such that hooks 170 may be squeezed together to fit through a hole. Hooks 170 then extend outward from elongated members 168 such that hooks 170 catch on a lip of the hole. The elongated members 168 may include a gap in between them to enable the members 168 to be squeezed together. Accordingly, fastener section 166 can be used to secure or fasten clip 100 to some other object such as, but not limited to, the floor of a vehicle.

As previously mentioned, top portion 102 may include a threaded aperture 104 that enables bottom portion 152 to be connected to top portion 102. Aperture 104 is illustratively located in the center of top portion 102 and runs along an entire height of top portion 102. Alternatively, aperture 104 may only run along only a portion of a height of top portion 102. Threaded aperture 104 is formed from a cylindrical member 106. Cylindrical member 106 can have a diameter greater than the diameter of threaded shaft 154 such that threaded shaft 154 can fit within cylindrical member 106.

Top portion 102 may also include an annular ring 108. Annular ring 108 is connected to cylindrical member 106 utilizing one or more spoke members 110 that extend between ring 108 and cylindrical member 106. In one embodiment, there are four spoke members 110. However, embodiments are not limited to any particular number of spoke members 110 and may include any number (e.g. 0, 1, 2, 3, 4, etc.).

Annular ring 108 optionally includes a beveled edge or a knife edge having an inner circumference 112, an outer circumference 114, and an annular surface 116 that extends between circumferences 112 and 114. In one embodiment, annular surface 116 is angled. For instance, outer circumference 114 may extend down lower than inner circumference 112. In other words, annular surface 116 is angled upwards in going from outer circumference 114 to inner circumference 112. Accordingly, the angled annular surface 116 can help in forming a seal between top portion 102 and another object such as, but not limited to, a floor mat or floor liner. This can help prevent liquids and other materials from leaking from a floor mat down into an attachment hole. For instance, the beveled edge or knife edge can groove into the mat or liner, and create a water tight or substantially water tight seal. Furthermore, it should be highlighted that this water tight or substantially water tight seal is illustratively formed with requiring a gasket or any other parts.

Finally with respect to FIG. 1, top portion 102 may include a top surface 118. Top surface 118 may include a handle or gripping portion that enables a user to screw top portion 102 onto bottom portion 152. Additionally, it should be noted that embodiments of the present disclosure are not limited to any particular shapes. For example, FIG. 1 shows both top portion 102 and bottom portion 152 as being rounded. Embodiments are not limited to only rounded configurations. Embodiments could alternatively have any other shape such as squared, rectangular, oval, etc. Furthermore, embodiments of clips can be made of any material. In one particular embodiment, for illustration purposes only and not by limitation, clip 100 is made from a plastic material. In another embodiment, clip 100 is made from an engineering resin that is flexible enough to enable the clip to collapse, pop back out, and spring back. The engineering resin is however rigid enough such that the clip does not break.

Figure 2:
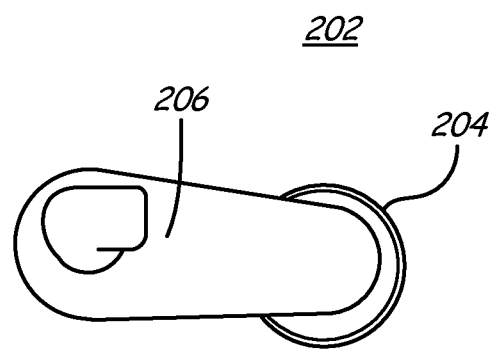
FIG. 2 is a perspective view of a floor mat or floor liner hook that can be replaced with a clip.

FIGS. 2-7 illustrate how a floor mat or floor liner clip 100 according to the present disclosure can be used to connect a floor mat or a floor liner to a floor of a vehicle. FIG. 2 shows a vehicle floor 202 that has an aperture 204 and a hook mechanism 206. A vehicle may have a number of apertures 204 and hook mechanisms 206 along its floor. In one embodiment, a vehicle is sold with apertures 204 and hook mechanisms 206. A customer may then buy a kit having one or more clips 100 and one or more floor mats or floor liners. The customer can then use the apertures 204 to install the kits as is shown below.

Figure 3:
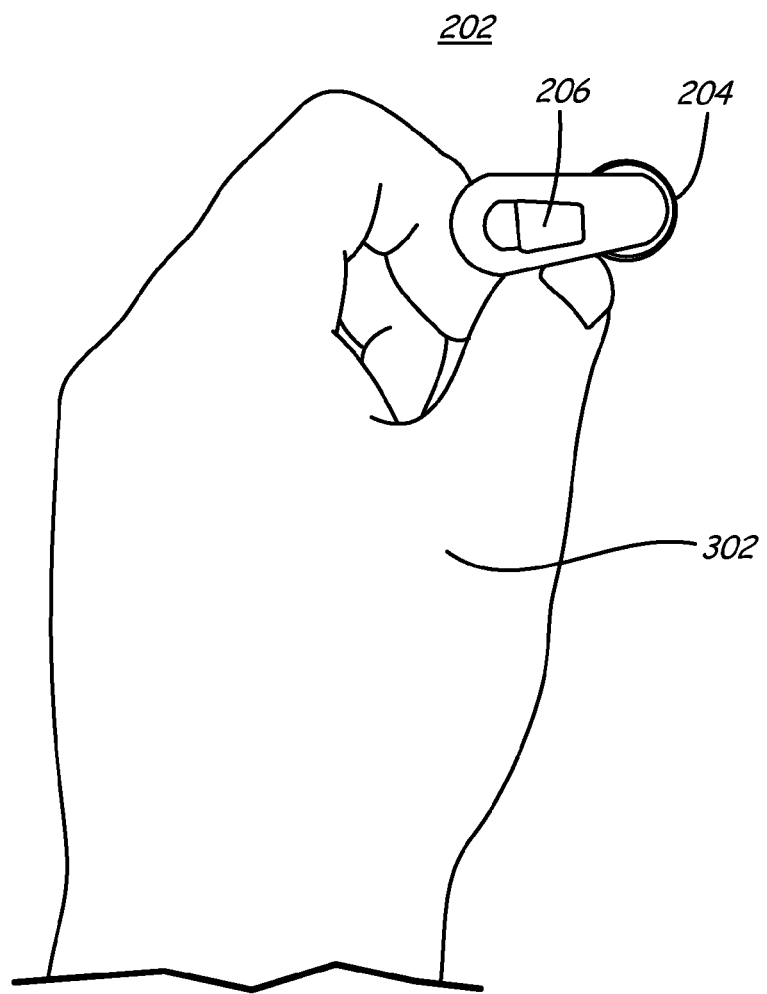
FIG. 3 is a perspective view of a floor mat or floor liner hook being removed.

FIG. 3 shows how a customer might remove a hook mechanism 206. The customer illustratively places one or more fingers 302 beneath hook mechanism 206 and applies pressure to dislodge hook mechanism 206 from aperture 204. Of course, this is just one example. Embodiments are not limited to any particular implementation, and may include any manner of removing a hook mechanism 206. Furthermore, a vehicle may not have a hook mechanism 206, but may have some other sort of mechanism that could similarly be removed to expose an aperture 204.

Figure 4:
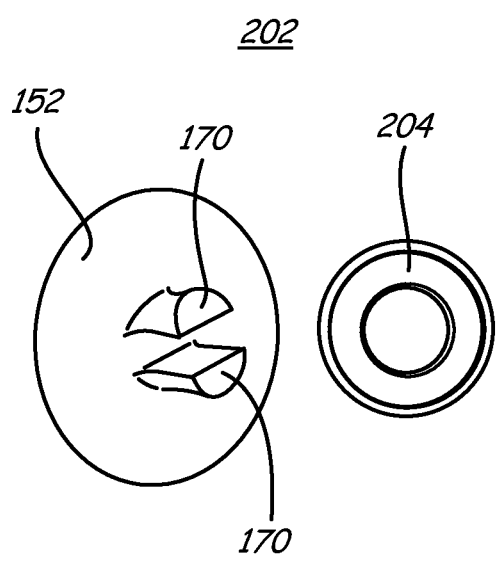
FIG. 4 is a perspective view of a vehicle floor aperture.

FIG. 4 shows the vehicle floor 202 once hook mechanism 206 has been removed and the aperture in the floor 204 is exposed. As can be seen in the figure, the hooks 170 of clip bottom portion 152 illustratively extend out wider than a circumference of the floor aperture 204. Therefore, bottom portion 152 is able to be securely connected to the floor 202.

Figure 5:
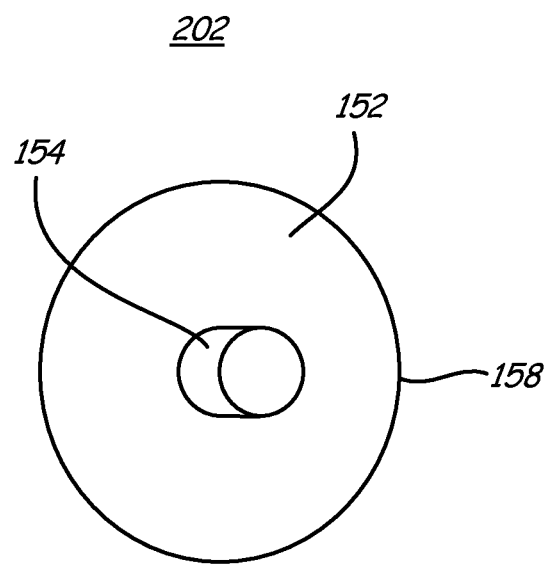
FIG. 5 is a perspective view of a bottom portion of a floor mat or floor liner clip being installed into a vehicle floor.

FIG. 5 shows clip bottom portion 152 once it has been placed in and secured to the floor aperture 204 (shown and labeled in FIG. 3). When secured to floor 202, the disk portion 158 of the clip is parallel or approximately parallel to the surface of floor 202, and the threaded shaft portion 154 is perpendicular or approximately perpendicular to the surface of floor 202. Additionally, protrusions 164 (shown and labeled in FIG. 1) optionally extend into carpeting on floor 202 to help prevent bottom portion 152 from moving.

Figure 6:
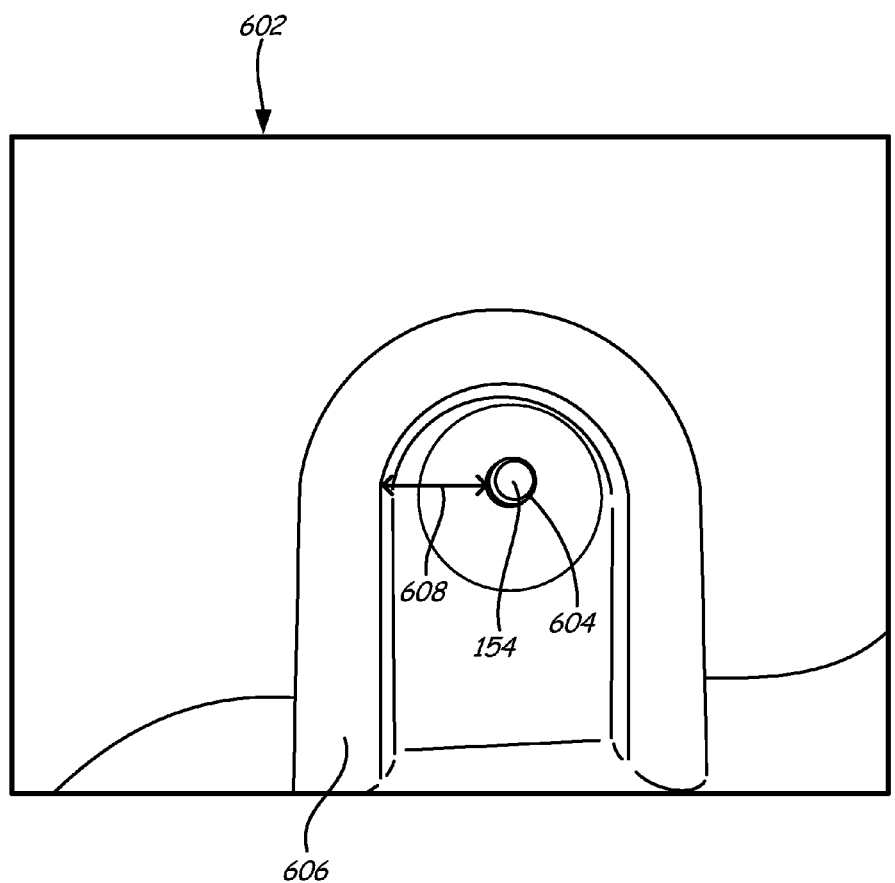
FIG. 6 is a perspective view of a vehicle floor mat or floor liner being placed over a bottom portion of a clip.

FIG. 6 shows a vehicle floor mat or floor liner 602 placed over a clip bottom portion 152 (shown and labeled in FIG. 5). Vehicle floor mat or floor liner 602 illustratively includes an aperture 604 that enables threaded shaft 154 of the clip to pass through. Floor mat or floor liner 602 also includes a ridge 606. Ridge 606 is spaced apart from aperture 604 by a distance 608 that is greater than the radius of the clip top portion 102 (shown and labeled in FIG. 1). This allows for the clip to be placed within the area enclosed by the ridge 606.

Figure 7:
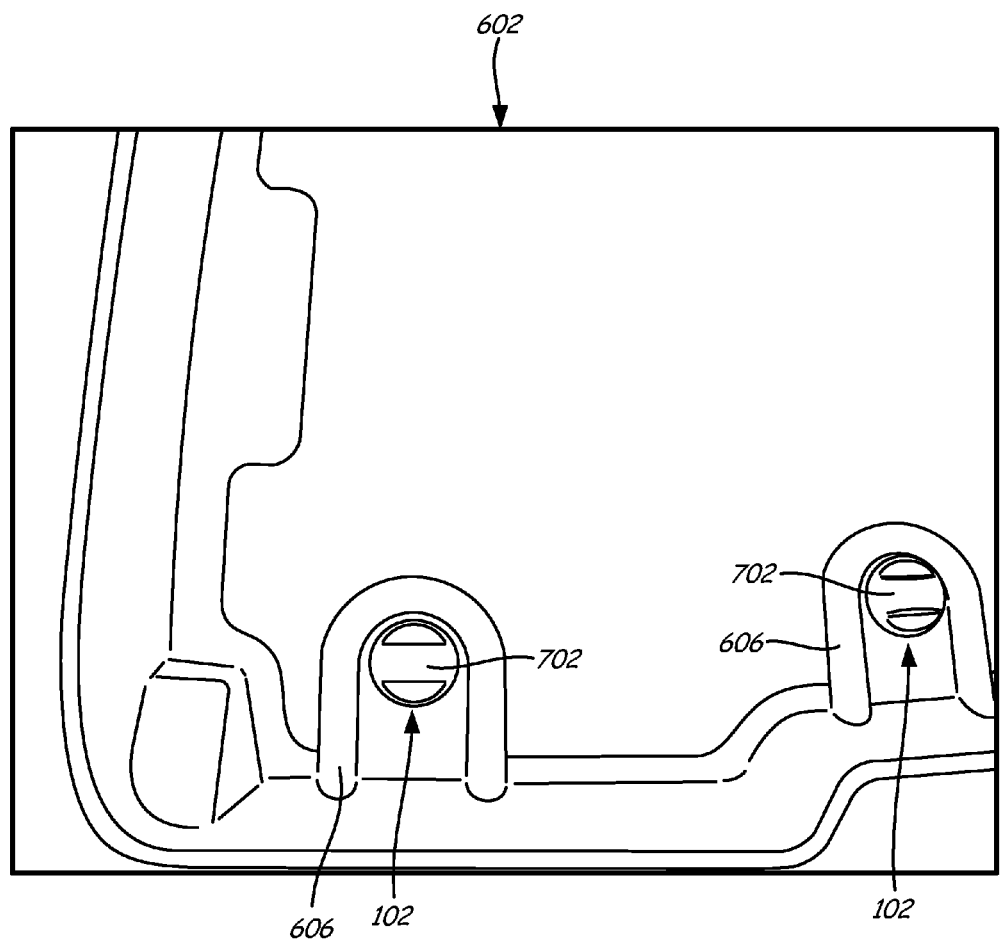
FIG. 7 is a perspective view of a vehicle floor mat or floor liner being held in place using two clips.

FIG. 7 shows vehicle floor mat or floor liner 602 being held in place utilizing two clips. In particular, FIG. 7 shows that two clip top portions 102 are placed over and threaded into bottom portion shafts 154 (shown and labeled in FIG. 6). In an embodiment, a ridge 606 surrounds each of the clips. Ridges 606 may be useful in distributing pressure placed on a clip. For instance, instead of all of the pressure from a foot being placed directly on the top portion of a clip 154, the pressure is instead distributed across the top portion 154 and the ridge 606. Additionally, ridges 606 may help to prevent liquids and other materials from reaching and leaking down apertures 604 (shown and labeled in FIG. 6). Furthermore, FIG. 7 also shows that top portions 102 illustratively include a handle or gripping portion 702 that enables a customer to tighten or loosen the clips.

Figure 8:
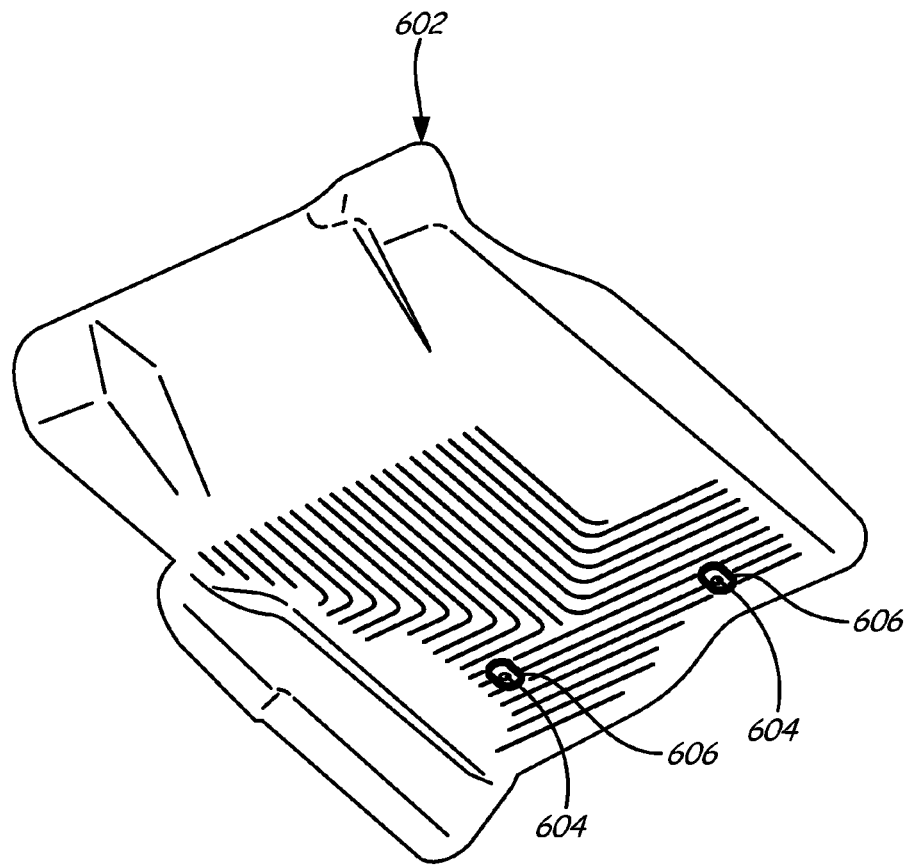
FIG. 8 is a perspective view of a vehicle floor mat or floor liner by itself without any clips.

FIG. 8 shows a vehicle floor mat or floor liner 602 by itself without a vehicle floor or a clip. In one embodiment, floor mat or floor liner 602 includes two apertures 604, and each of the apertures 604 is surrounded by a ridge 606. Embodiments are not however limited to any particular number of apertures 604 or ridges 606, and may include any number of apertures 604 and ridges 606 (e.g. 0, 1, 2, 3, 4, 5, 6, etc.). Furthermore, it should be noted that in certain embodiments, that one or more floor mats or floor liners 602 and one or more clips 100 are sold as kits. For example, a kit may include four floor mats or floor liners 602 and two clips 100 for each floor mat. A customer could then buy the kit and install it in his or her vehicle. In another embodiment, only a floor mat or floor liner 602 that is configured to be installed in the driver's portion of a vehicle has apertures for clips. Accordingly, a kit may only include enough clips to secure one floor mat or liner. Embodiments are not however limited to kits having any number of mats, liners, or clips, and embodiments include kits having any number and combination of mats, liners, and clips.

As has been described above, embodiments of the present disclosure include clips. In certain embodiments, the clips may be used to secure floor mats or floor liners to the floor of a vehicle. The clips may be sold together along with one or more floor mats or liners as a kit. A customer can purchase a kit and install the floor mats or liners into his or her vehicle using the clips. The clips can be useful for preventing the floor mats or liners from moving. Some useful features of the clips include tilted edges and ridges that prevent liquids and other materials from leaking onto the vehicle floor. Furthermore, clips could possibly be useful in other settings and are not strictly limited to just a vehicle setting. Additionally, embodiments have been described as being used in conjunction with floor mats and/or floor liners. Embodiments can be used with any type of vehicle floor covers or covering (e.g. mat, liner, etc.), and are not limited to just strictly mats or liners.

Finally, it is to be understood that even though numerous characteristics and advantages of various embodiments have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A vehicle floor covering kit comprising:
   one or more vehicle floor covers, at least one of the vehicle floor covers including at least one aperture;
   a clip having a first portion and a second portion, the first portion being configured to secure the clip to a floor of a vehicle, and the second portion being configured to secure the floor cover to the clip utilizing the at least one aperture, wherein the clip second portion comprises a knife edge having an annular ring with a tilted surface.

2. The kit of claim 1, wherein the clip first portion comprises a threaded shaft, and the clip second portion comprises a threaded aperture.

3. The kit of claim 2, wherein the threaded shaft fits through the at least one aperture in the vehicle floor cover.

4. The kit of claim 1, wherein the at least one of the vehicle floor covers includes at least one ridge surrounding the at least one aperture.

5. The kit of claim 1, wherein the clip first portion has a protrusion configured to prevent the clip from moving relative to the floor of the vehicle.

6. The kit of claim 1, wherein the clip first portion includes a fastener section.

7. A vehicle floor covering clip comprising:
   a top portion having a threaded aperture and an annular ring that surrounds the threaded aperture, the annular ring having a tilted surface between an inner circumference and an outer circumference; and
   a bottom portion having a threaded shaft, a disk, and a fastener section, the threaded shaft being configured to be threaded into the threaded aperture of the top portion, the disk separating the threaded shaft from the fastener section, and the fastener section being configured to secure the vehicle floor covering clip to a floor of a vehicle.

8. The clip of claim 7, wherein the top portion includes one or more spokes that extend between the threaded aperture and the annular ring.

9. The clip of claim 7, wherein the top portion includes a gripping portion that is configured to enable a user to turn the top portion.

10. The clip of claim 7, wherein the fastener section includes elongated members that extend outward from the disk.

11. The clip of claim 10, wherein each of the elongated members includes a hook that extends outward from the corresponding elongated member.

12. The clip of claim 10, wherein the fastener section includes a gap between the elongated members.

13. The clip of claim 7, wherein the clip is made from a plastic material.

14. A vehicle floor covering kit comprising:
   a vehicle floor covering having an aperture that is surrounded by a ridge;
   a first portion of a clip having a threaded shaft that is configured to extend through the aperture; and
   a second portion of a clip having a threaded aperture that is configured to be attached to the threaded shaft, the second portion further comprising an annular ring that surrounds the threaded aperture wherein the annular ring includes an inner circumference, an outer circumference and a tilted surface that extends between the inner and outer circumferences.

15. The kit of claim 14, wherein the second portion includes a fastener section that is configured to secure the clip to a floor of a vehicle.

16. The kit of claim 14, wherein the kit includes multiple floor covers and multiple clips.

* * * * *